US007002276B2

(12) United States Patent
Evans et al.

(10) Patent No.: US 7,002,276 B2
(45) Date of Patent: Feb. 21, 2006

(54) ARMATURE WITH COATED LAMINATE BUNDLE

(75) Inventors: Susanne Evans, Buehl (DE); Juergen Herp, Buehl (DE); Matthias Henschel, Rheinmuenster (DE); Harald Bux, Huettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 54 days.

(21) Appl. No.: 10/415,227

(22) PCT Filed: Nov. 12, 2001

(86) PCT No.: PCT/DE01/04210

§ 371 (c)(1),
(2), (4) Date: Apr. 25, 2003

(87) PCT Pub. No.: WO02/39565

PCT Pub. Date: May 16, 2002

(65) Prior Publication Data

US 2004/0047090 A1 Mar. 11, 2004

(30) Foreign Application Priority Data

Nov. 11, 2000 (DE) ................................ 100 56 036

(51) Int. Cl.
*H02K 21/12* (2006.01)

(52) U.S. Cl. ........................ 310/156.53; 310/156.56; 310/156.01; 310/156.38; 310/156.21; 310/261

(58) Field of Classification Search .......... 310/156.53, 310/156.09, 156.01, 156.47, 254, 261
See application file for complete search history.

(56) References Cited

U.S. PATENT DOCUMENTS

| 2,323,114 | A |   | 6/1943  | Bradford et al. ............. 310/218 |
| 4,469,970 | A | * | 9/1984  | Neumann ............... 310/156.78 |
| 4,777,397 | A |   | 10/1988 | Parshall ................. 310/156.13 |
| 4,954,736 | A | * | 9/1990  | Kawamoto et al. ..... 310/156.21 |
| 5,581,140 | A | * | 12/1996 | Futami et al. ......... 310/156.53 |
| 5,684,352 | A | * | 11/1997 | Mita et al. ............. 310/156.56 |
| 5,760,520 | A |   | 6/1998  | Hasebe et al. .............. 310/261 |
| 5,936,323 | A | * | 8/1999  | Shibukawa et al. .... 310/156.53 |
| 6,144,131 | A | * | 11/2000 | Hollenbeck et al. ... 310/156.53 |

FOREIGN PATENT DOCUMENTS

| EP | 0 748 027     |   | 12/1996 |
| EP | 0 909 003 A   |   | 4/1999  |
| JP | 622262643 A   | * | 11/1987 |
| JP | 9-46946       |   | 2/1997  |
| JP | 09163649 A    | * | 6/1997  |
| JP | 11089130 A    | * | 3/1999  |
| JP | 2000-152535   |   | 5/2000  |

OTHER PUBLICATIONS

Patent Abstracts of Japan Vol. 2000, No. 10, Nov. 17, 2000 & JP 2000 197291 A, Jul. 14, 2000.

* cited by examiner

*Primary Examiner*—Darren Schuberg
*Assistant Examiner*—Yahveh Comas
(74) *Attorney, Agent, or Firm*—Michael J. Striker

(57) ABSTRACT

An armature of the prior art has a lamination packet which leads to a high loss of magnetic flux in the lamination, since it completely encloses the magnets that are disposed in the lamination.

An armature (1) of the invention comprises at least one lamination (1) that only partly encloses the magnets (24). Losses in the magnetic flux are thus reduced.

1 Claim, 3 Drawing Sheets

ARMATURE WITH COATED LAMINATE BUNDLE

BACKGROUND OF THE INVENTION

The invention is based on an armature for an electrical machine.

From Japanese Patent Disclosure JP 2000152535 A, a stack of laminations is known that has only open pockets for magnets, in which the magnets are held by positive and nonpositive engagement. The individual lamination has no external web that retains the magnet on its outer circumference. The mechanical load on the lamination is high.

From JP 09046946 A, a stack of laminations is known in which the magnets are disposed entirely in closed pockets of the lamination. By means of the additional iron of the web, which grips the magnets on the outer circumference and closes the pocket, a significant flux loss occurs in the web and in the peripheral region of the magnets; this leads to a reduction in the power of an electrical machine for which the stack of laminations is used.

From U.S. Pat. No. 2,323,114, a lamination packet is known in which by means of a special embodiment of the laminations for the lamination packet, magnetic flux losses are reduced because the stator teeth are at least partly disconnected from one another.

From U.S. Pat. No. 4,777,397, an armature is known in which a certain of laminations have only closed pockets, in which the magnet is at least partly disposed. The other laminations have only open pockets, and so there the magnet is not surrounded on its outer circumference by a metal sheet. The magnets are secured in the open pockets by an adhesive. This requires two different versions of laminations.

SUMMARY OF THE INVENTION

The armature of the invention has the advantage over the prior art that magnets are fixed by a lamination packet in a simple way, and the magnetic flux loss is reduced.

The magnet can advantageously be fixed in the lamination packet by being spray-coated. This can be done by plastic spraying, for instance. A protection against external environmental factors is thus assured as well.

BRIEF DESCRIPTION OF THE DRAWINGS

One exemplary embodiment of the invention is shown in simplified form in the drawing and explained in further detail in the ensuing description.

Shown are

DESCRIPTION OF THE PREFERRED EMBODIMENTS

Figure 1:
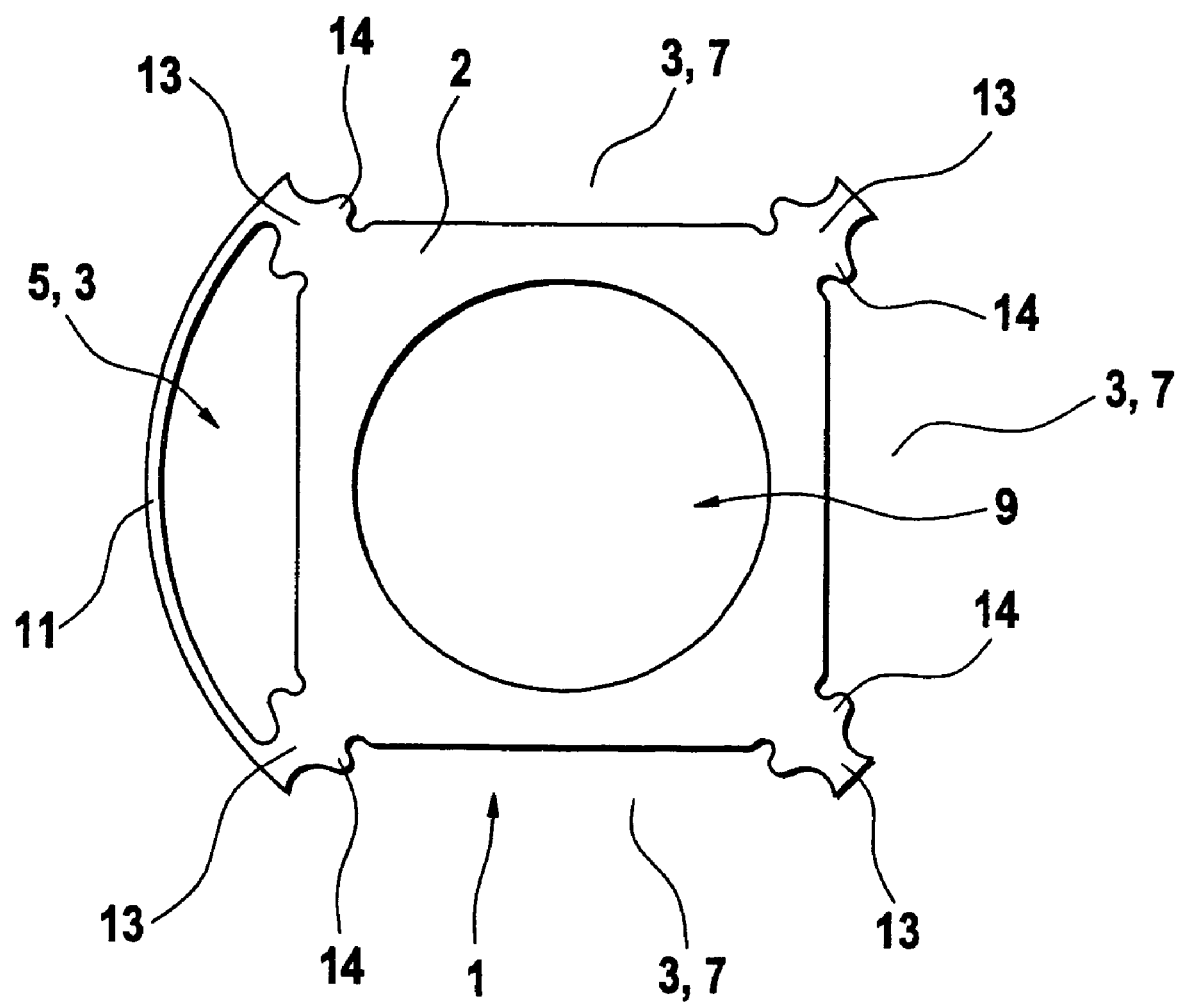
FIG. 1, a lamination for an armature of the invention.

FIG. 1 shows a lamination 1, which is formed of a base body 2 and a plurality of protrusions 13, which protrude radially outward from the base body.

The base body 2, which is essentially provided with a square outer contour, has a hole 9 in its middle, in which a rotor shaft 22 (FIG. 3) is disposed. The base body 2 completely surrounds the rotor shaft 2 on its outer radial circumference.

The protrusions 13, provided for instance at corners of the base body 2, form a pocket, in which a magnet 24 (FIG. 3) is disposed. The lamination 1 has a number n of pockets 3. A number [n−m] of pockets, where m is less than n and is greater than zero, form closed pockets 5, for at least one lamination 1, that are formed such that one web 11 connects two protrusions 13 to one another, in a manner spaced apart from the base body 2.

In this exemplary embodiment, there are four pockets 3, which are formed by four protrusions 13, and of these there is one closed pocket 5. The number n is accordingly four, and the number m is three; that is, there are three open pockets 7. The protrusions 13 are embodied such that the magnetic flux loss in this peripheral region is reduced considerably. Lugs 14 pointing into the pockets 3 are provided on the protrusions 13; they guide the magnets in quasi-punctate form and bring about a reduction in flux losses.

Figure 2:
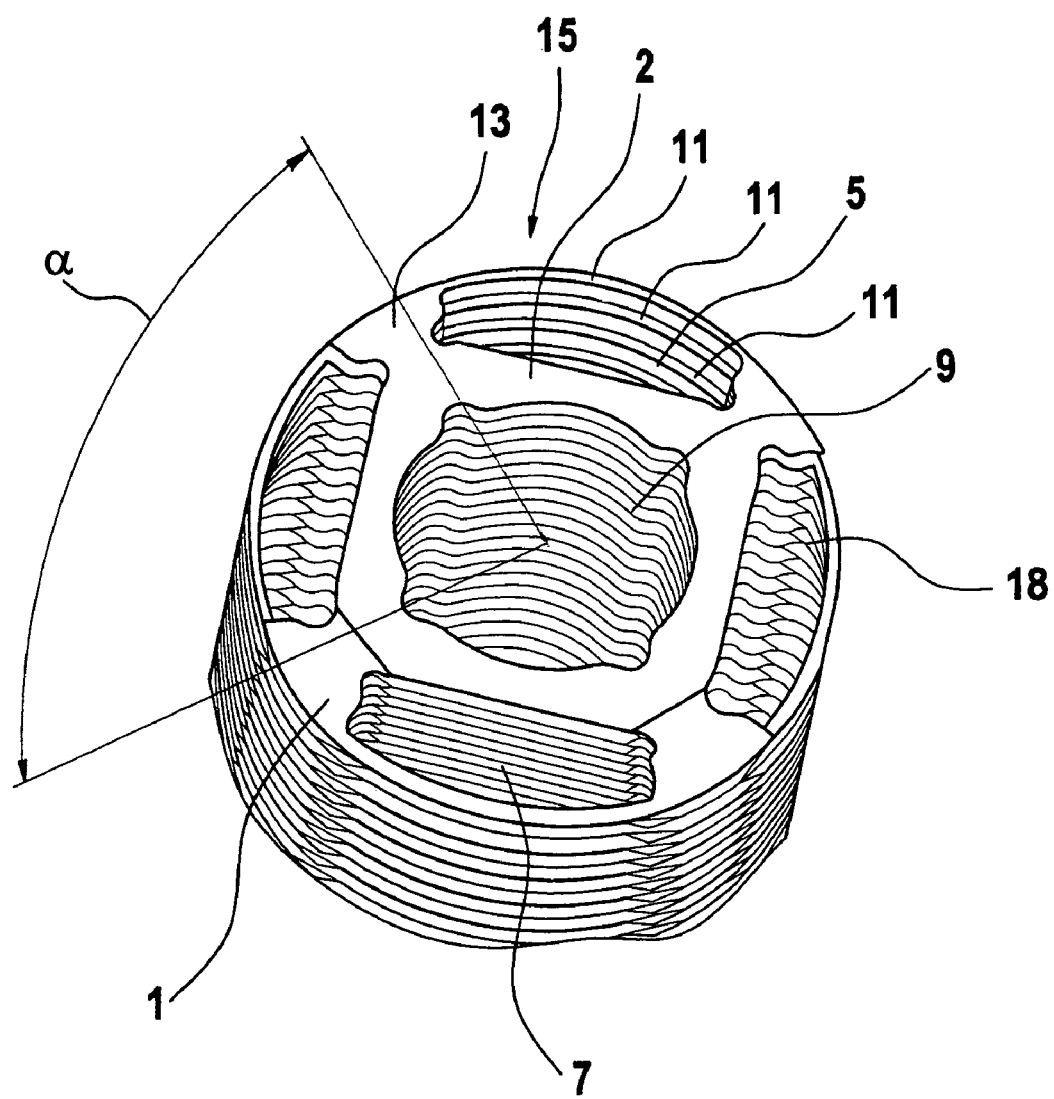
FIG. 2, a lamination packet formed of laminations of FIG. 1.

FIG. 2 shows how the laminations 1 are disposed to make a lamination packet 15. In this example, four magnets 24 can be held in the lamination packet 15. However, the laminations 1 of the lamination packet 15 can also be embodied such there are either fewer than four magnets 24, or more than four of them.

The directly adjacent laminations 1, for instance, are therefore rotated continuously relative to one another by an angle of 90° (that is, 360° because of the number of magnets, or n). As a result of this stacking of the laminations 1 rotated relative to one another, closed pockets 5 form four receptacles 18, into which the magnets 24 can be introduced and in which they can be radially secured.

As a result of this comblike structure of the lamination packet 15, the magnetic flux loss is reduced considerably. The laminations 1 are joined together in a known way and then form the lamination packet 15. Moreover, only one version of a lamination 1 is necessary to form the lamination packet 15. In the exemplary embodiment shown in FIG. 2, protrusions 13 are provided on only two corners of the base body 2 and joined together by the web 11.

Figure 3:
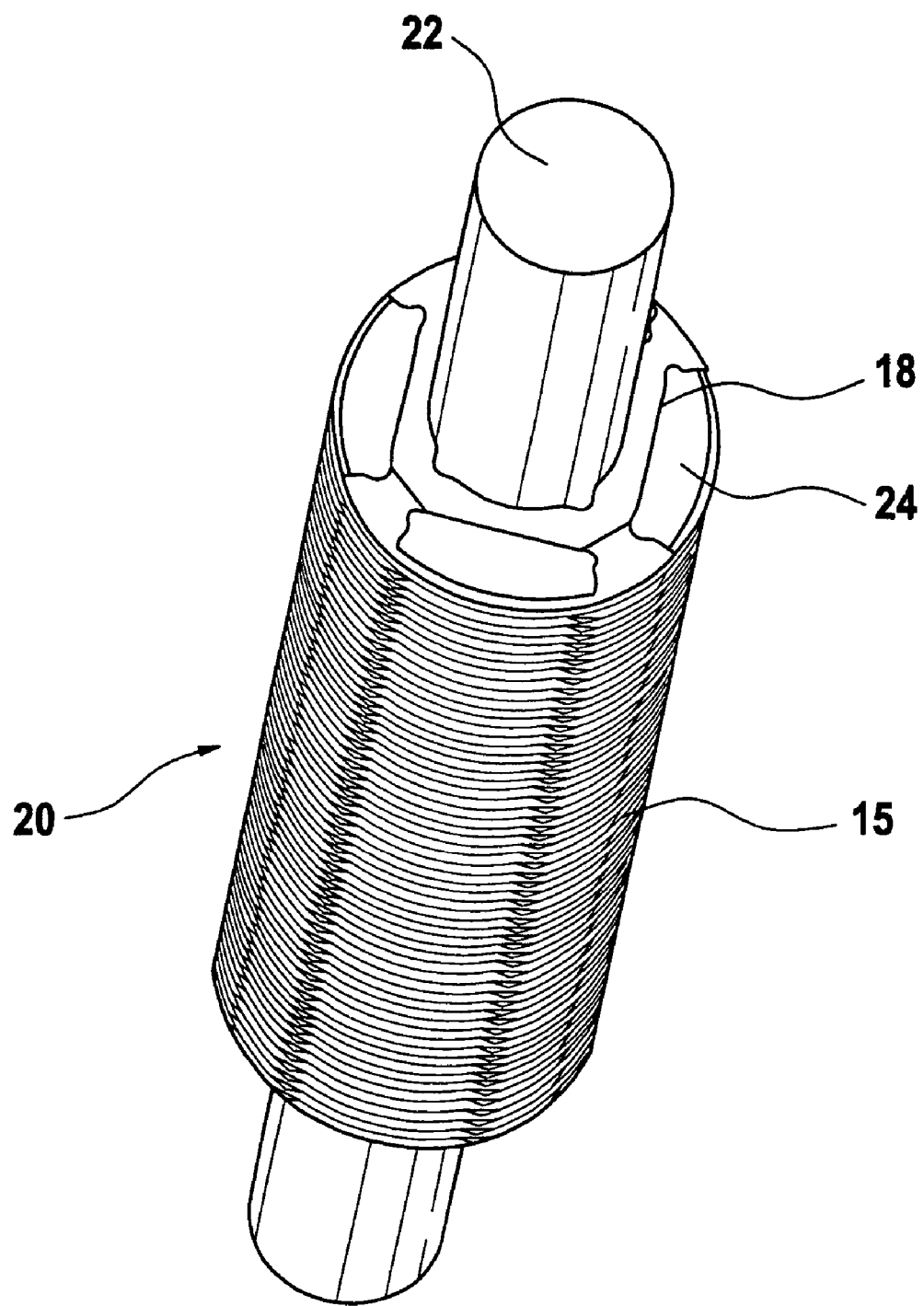
FIG. 3, an armature of the invention.

FIG. 3 shows an armature 20 of the invention for an electrical machine, such as an electric motor or an electric generator.

The armature 20 is formed of at least one rotor shaft 22, which is disposed in the hole 9 and solidly joined to the lamination packet 15. The magnets 24 are disposed in the receptacles 18. The magnet 24 is fixed for instance, among other options, by a press fit in the pocket 5, 7 of the lamination 1. It is also possible for the lamination packet 15 with the magnets 24 to be spray-coated, for instance by plastic spray-coating, thereby fixing the magnet 24 in the lamination packet 15. The laminations 1 can also be fixed by the spray-coating to form a lamination packet 15.

The armature 20 of the invention is not limited to this exemplary embodiment. Two or three pockets 5 can also be present where the number of magnets is four; in that case, the individual laminations are rotated by an angle of 180°, for instance. Any other number of open and closed pockets 3, including with a higher or lower number of magnets, is conceivable. It is also possible for there to be laminations 1 at some points in the lamination packet 15 that have only open pockets 7 or only closed pockets 5. Moreover, not every lamination 1 has to be rotated relative to the lamination 1 directly adjacent to it. Two or more successive identical laminations 1 in one lamination packet 15 may instead not be rotated relative to one another, and can then be followed by at least one lamination that is in turn rotated relative to them.

What is claimed is:

1. An armature for an electrical machine, comprising at least a rotor shaft; at least two laminations in which at least one of said laminations has at least one closed pocket, said at least one pocket being formed by one web that is spaced apart from a base body of the armature, such that the one web connects two protrusions to one another in a manner spaced from the base body of the armature; at least one magnet which is retained by said at least one lamination, said magnet being disposed partly in said closed pocket of said at least one lamination, wherein the armature has a number n of said magnets, and wherein said at least one lamination has a number n–m of said closed pockets where m is less than n and greater than zero, said at least one lamination being rotated in laminations being stacked to form a lamination packet, wherein both said lamination packet end said magnets are provided with a spray-coating, so that said spray-coating fixes said laminations to form said lamination packet, and also said spray-coating fixes said magnets, disposed in said closed pockets, to said lamination packet.

* * * * *